Dec. 22, 1925.
M. B. GRAHAM
1,566,594
FISHING REEL
Filed Jan. 26, 1924
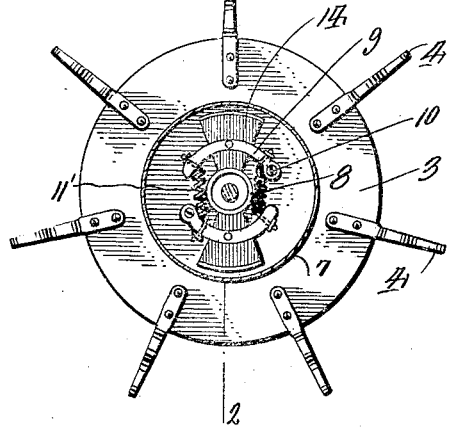
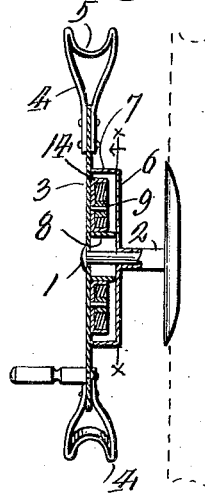
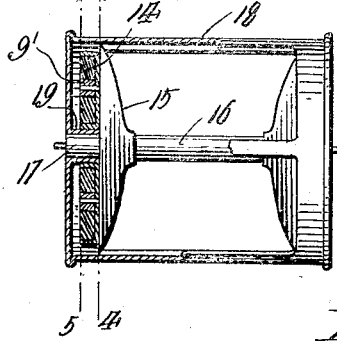
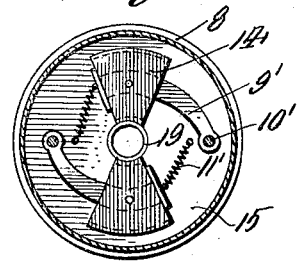
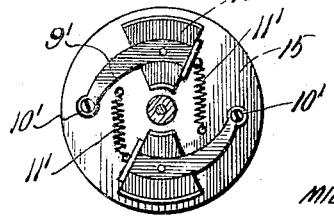
WITNESSES
Inventor
MILTON B. GRAHAM
By Richard B. Owen
Attorney Patented Dec. 22, 1925.

1,566,594

UNITED STATES PATENT OFFICE.

MILTON B. GRAHAM, OF WINDFALL, INDIANA, ASSIGNOR TO GRAHAM REEL COMPANY, OF WINDFALL, INDIANA.

FISHING REEL.

Application filed January 26, 1924. Serial No. 688,849.

*To all whom it may concern:*

Be it known that I, MILTON B. GRAHAM, citizen of the United States, residing at Windfall, in the county of Tipton and State of Indiana, have invented certain new and useful Improvements in Fishing Reels, of which the following is a specification.

The present invention appertains to fishing reels and more particularly to fishing reels of the free spool type such as are commonly used in casting.

The object of the invention is to provide improved means for preventing back lash of the reel that is preventing the spool from rotating fastener than the rate at which the line pays out, thereby maintaining a taut line and preventing the line from becoming tangled or reversely wound.

A further object of the invention is to provide an improved anti-back lash attachment for fishing reels which serve to retard the free rotation of the spool when unwinding the line in casting, said retarding action being greater as the line is paying out at a rapid rate of speed than when it is paying rather slowly toward the end of the cast.

With the above and numerous other objects in view as will appear as the description progresses, the invention resides in certain novel features of construction, and in the combination and arrangement of parts as will be hereinafter more fully described and claimed.

In the drawing, which represents the preferred embodiments of the invention,

Figure 1 represents a section through a taut reel taken substantially on the line x—x of Figure 1 looking in the direction of the arrow, Figure 2 is a section taken at right angles to that shown in Figure 1 substantially on the line 2—2 thereof, Figure 3 is an elevation of a reel of the spool type showing my invention associated therewith, Figure 4 is a section taken substantially on the line 4—4 of Figure 3, and Figure 5 is a section taken substantially on the line 5—5 looking in the direction of the arrows.

Referring to the drawing in detail and particularly the embodiments shown in Figures 1 and 2 it will be seen that 1 designates the spindle which is fixed to the rod in any suitable well known manner as by the means shown at 2. A disk 3 is rotatable on the spindle 1 and has attached thereto the prongs 4 which are constructed with a relatively broad base 5 and then tapered downwardly so as to be riveted adjacent the periphery of the disk 3 thus eliminating the danger of the line wrapping around the prongs and breaking the line thereby losing the bait. A plate 6 is fixed stationary with the spindle 1 and is provided with an outer drum 7 and an inner drum 8. A pair of arms 9 are pivoted at one end and at 10 to the disk 3 and springs 11 are connected to the free ends of these arms and also to the disk or to the pivoted ends of the other arms, the former structure being shown in Figure 5 and the latter structure in Figure 1. Brake shoes 14 are attached to the arms 5 and their ends are arcuate in shape so as to be concentric with the adjacent drums 7 and 8. These shoes preferably taper toward their inner ends so that their inner bearing surfaces are smaller than their outer bearing surfaces. The springs 11 normally hold the arms 9 so that the shoes 14 frictionally engage the inner drum 8 for retarding the rotation of the reel.

Referring particularly to Figures 3 to 5 inclusive it will be seen that practically the same braking structure has been utilized with a reel embodying the rotatable spool which includes the disks 15 connected by the tubular member 16 which is rotatable on the fixed spindle 17. The arms 9' are pivoted at 10' to one disk 15 and the casing 18 forms the outer drum similar to 7 in Figures 1 and 2 while the sleeve 19 forms the inner drum similar to 8 in Figures 1 and 2. As noted above the springs 11' are attached to the free ends of the arms and at their other ends to the disk 15 instead of to the opposite pivoted end of the opposite lever as shown in Figure 1.

In using this device as the cast is made the brake shoes swing outwardly and come into contact with the outer or larger drum checking the paying out or runaway movement of the line and excessive speed of the reel. As the jerk comes in making the start of the cast and as the speed is checked the brake shoes release the outer drum and the reel and the line run freely until nearly the end of the cast. As the speed diminishes the springs pull inwardly upon the arms bringing the brake shoes in until they come into contact with the smaller or inner drum, making a light drag causing the line to pay out evenly the entire distance of the cast.

Although I have described my invention with a certain degree of particularity, it is to be understood that numerous changes in the details of construction, and in the combination and arrangement of parts may be resorted to without departing from the spirit or scope of the invention as hereinafter claimed.

Having thus described my invention, what I claim as new is:

1. In a fishing reel of the class described, a reel proper, a stationary outer drum, a stationary inner drum, an arm pivoted at one of its ends to the reel proper, a brake shoe on said arm capable of swinging into engagement with the outer drum by the centrifugal force caused by the rotation of said reel, and a spring counter-acting the centrifugal force and holding the shoe in engagement with the inner drum when said reel is rotated at a comparatively slow rate of speed or if stationary.

2. In a fishing reel of the class described, a reel proper, a stationary outer drum, a stationary inner drum, an arm pivoted at one of its ends to the reel proper, a brake shoe on said arm capable of swinging into engagement with the outer drum by the centrifugal force caused by the rotation of said reel, a spring counter-acting the centrifugal force and holding the shoe in engagement with the inner drum when said reel is rotated at a comparatively slow rate of speed or if stationary, said shoe being provided with a comparatively large outer engaging end and a comparatively small inner engaging end.

In testimony whereof I affix my signature.

MILTON B. GRAHAM.